United States Patent
Movida et al.

(10) Patent No.: US 9,462,002 B2
(45) Date of Patent: Oct. 4, 2016

(54) SYSTEM, METHOD, AND COMPUTER PROGRAM PRODUCT FOR SHARING FILES BASED ON USER PROFILE VISIBILITY

(71) Applicant: salesforce.com, inc., San Francisco, CA (US)

(72) Inventors: Mark Movida, Berkeley, CA (US); Miko A. Bose, San Francisco, CA (US); Robert J. Snell, Edgware (GB)

(73) Assignee: salesforce.com, inc., San Francisco, CA (US)

(*) Notice: Subject to any disclaimer, the term of this patent is extended or adjusted under 35 U.S.C. 154(b) by 12 days.

(21) Appl. No.: 14/562,586

(22) Filed: Dec. 5, 2014

(65) Prior Publication Data
US 2016/0105442 A1   Apr. 14, 2016

Related U.S. Application Data

(60) Provisional application No. 62/062,762, filed on Oct. 10, 2014.

(51) Int. Cl.
*H04L 9/00* (2006.01)
*H04L 29/06* (2006.01)
*H04L 29/08* (2006.01)

(52) U.S. Cl.
CPC ........... *H04L 63/102* (2013.01); *H04L 65/403* (2013.01); *H04L 67/10* (2013.01); *H04L 67/306* (2013.01)

(58) Field of Classification Search
CPC ..... H04L 63/10; H04L 63/101; G06F 21/60; G06F 21/62; G06F 21/604

USPC .............. 726/27–30; 713/193; 709/225, 229
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |

(Continued)

*Primary Examiner* — Hosuk Song

(57) ABSTRACT

In accordance with embodiments, there are provided mechanisms and methods for sharing files based on user profile visibility. These mechanisms and methods for sharing files based on user profile visibility can enable community network systems to provide functionality restricting access to files based on the profile to which the file is posted. In particular, a file posted to a profile of one member of a community may be made accessible to other members of the community that are permitted to access that profile.

20 Claims, 6 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,820,204 B1 * | 11/2004 | Desai ............... G06F 21/6245 705/51 |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,552,862 B2 * | 6/2009 | Flake ............... G06Q 30/00 235/375 |
| 7,620,655 B2 | 11/2009 | Larsson et al. |
| 7,698,160 B2 | 4/2010 | Beaven et al. |
| 7,730,478 B2 | 6/2010 | Weissman |
| 7,779,039 B2 | 8/2010 | Weissman et al. |
| 7,793,334 B2 * | 9/2010 | Lewis ............... H04L 63/083 726/17 |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,121,999 B2 * | 2/2012 | Hansen ............... G06F 17/3087 707/706 |
| 8,275,836 B2 | 9/2012 | Beaven et al. |
| 8,457,545 B2 | 6/2013 | Chan |
| 8,484,111 B2 | 7/2013 | Frankland et al. |
| 8,875,247 B2 * | 10/2014 | Bao ............... G06F 21/31 704/260 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 | 10/2005 | Weissman et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2013/0218948 A1 | 8/2013 | Jakobson |
| 2013/0218949 A1 | 8/2013 | Jakobson |
| 2013/0218966 A1 | 8/2013 | Jakobson |

* cited by examiner

SYSTEM, METHOD, AND COMPUTER PROGRAM PRODUCT FOR SHARING FILES BASED ON USER PROFILE VISIBILITY

CLAIM OF PRIORITY

This application claims the benefit of U.S. Provisional Patent Application 62/062,762 entitled "SYSTEM, METHOD AND COMPUTER PROGRAM PRODUCT FOR SHARING FILES BASED) ON USER PROFILE VISIBILITY," by Movida et al., filed Oct. 10, 2014, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to sharing files in a community network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Traditionally, community network systems provide functionality allowing members of a community defined within the system to share content with one another. One example of these community network systems is Chatter™ provided by Salesforce™. For example, one member may post content via the system for making the content accessible to one or more other members of the system. This content has included, just by way of example, text, files, links, etc. However, conventional techniques implemented by these community network systems for sharing content, and particularly files, have exhibited various limitations.

In the past, community network systems have generally implemented two techniques for allowing members of a community supported by the system to share content. In the first implementation, community network systems have allowed members to privately share content with other members. This has included one member posting content via the system for sharing with another member designated by the member posting the content. Thus, this implementation requires the member posting the content to manually designate each other member that is allowed to access the content, which can be cumbersome when a member desires to share content with numerous other particular members.

In another implementation, community network systems have allowed members to publicly share content with other members. This has included one member of a particular community posting content via the system for sharing with all members of that particular community. Thus, for public sharing the member posting the content has not been afforded an option for restricting members of the community from accessing the content.

There is accordingly a need for addressing these and/or other issues associated with the existing content sharing techniques implemented community network systems.

BRIEF SUMMARY

In accordance with embodiments, there are provided mechanisms and methods for sharing files based on user profile visibility. These mechanisms and methods for sharing files based on user profile visibility can enable community network systems to provide functionality restricting access to files based on the profile to which the file is posted. In particular, a file posted to a profile of one member of a community may be made accessible to other members of the community that are permitted to access that profile.

In an embodiment and by way of example, a method for sharing files based on user profile visibility is provided. In use, a community network is provided through a database system of a community network system, where the community network is accessible to users after being identified through the database system and the database system stores in a memory associated with or part of the database system a profile of each of the users, and where each of the profiles identifies which of the users have viewing privileges through the database system to the profile.

A first file posted to a profile of a set of first users that are a subset of the users is received by the community network system via the database system. Additionally, in response to receiving the first file, the profile of each of the first users is associated with a reference to the first file. Further, a request for files posted to the community network is received from a second one of the users, the request including criterion for the files. A query is generated, by the community network system, in accordance with the request.

Moreover, the query is executed, by a processor of the community network system, to provide the second user access to the first file based on viewing privileges of the second user, including: determining that the first file meets criterion of the query, determining the profile of each of the first users having the reference to the first file, and providing the second user access to the first file when the profile of at least one of the first users is accessible to the second user, otherwise the community network system denying the second user from accessing the first file when the profile of all of the first users is inaccessible to the second user.

While one or more implementations and techniques are described with reference to an embodiment in which sharing files based on user profile visibility is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for sharing files based on user profile visibility.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing sharing files based on user profile visibility will be described with reference to example embodiments.

Figure 1:
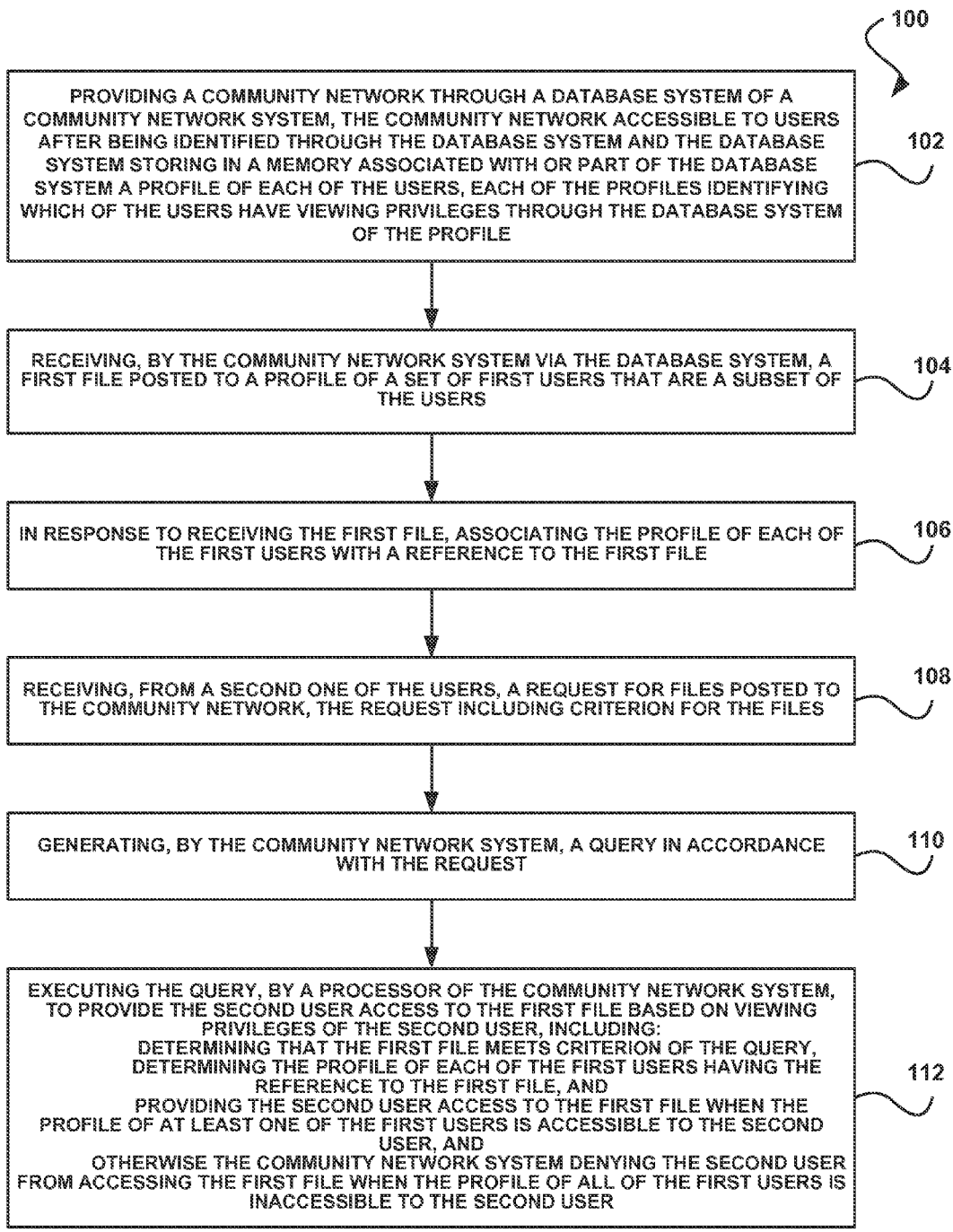
FIG. 1 illustrates a method for sharing files based on user profile visibility, in accordance with an embodiment.

FIG. 1 illustrates a method 100 for sharing files based on user profile visibility, in accordance with one embodiment. As shown in operation 102, a community network is provided through a database system of a community network system, where the community network is accessible to users after being identified through the database system and the database system stores in a memory associated with or part of the database system a profile of each of the users, and where each of the profiles identifies which of the users have viewing privileges through the database system to the profile.

In one embodiment, the community network system may be sub-system of the system described below with respect to FIGS. 5-6. For example, the community network system may include servers and/or other computing systems, including a database system as noted above, that are components of multi-tenant on-demand database system. Of course, however, the community network system may not necessarily be implemented in the context of the system described below with respect to FIGS. 5-6, but may be any system that includes servers and/or other computing systems, including a database system as noted above, for providing a community network that is accessible to users.

Further, in the context of the present description, the community network that is provided through the database system may be a service supporting one or more communities of users and allowing users of each community to communicate with one another. For example, the community network may provide social networking capabilities to the users of the community network. Various features of the community network may include allowing the users to post content (e.g. text, files, links, etc.) publicly to a community as a whole, privately to designated users, or to a group of users dynamically determined based on user profile visibility as described in more detail below.

As noted above, the community network is accessible to the users after being identified through the database system. Thus, the users of the community network may be identifiable by the database system. In one embodiment, each of the users may have an account with the community network system through the database system. The account may store a username and password which may be required to be input to the database system by the user in order for the user to access the community network.

As also noted above, the database system stores in a memory associated with or part of the database system a profile of each of the users. The profile of each user may at least include an identifier of the user and content posted to the profile by the user and/or other users with viewing privileges to the profile. In a further embodiment, the profile may be associated with the account of the user.

Each of the profiles also includes an indication of which of the users have viewing privileges through the database system to the profile. In other words, each of the profiles identifies which of the users are permitted to view the profile through the community network. Permission for a user to view a profile of another user may allow the user to view the content to posted to that profile and to view a webpage that is specific to the profile (e.g. a webpage that displays a content feed having the content posted to the profile, etc.). One exemplary implementation of viewing privileges to user profiles is the User Sharing feature of Salesforce™, described at https://help.salesforce.com/HTViewHelpDoc?id=security_sharing_users.htm&language=en_US.

In one exemplary embodiment, the profile may indicate one or more types of users that have viewing privileges to the profile. These one or more types of the users may include a different user role (e.g. role within a community, etc.). Just by way of example, where a company utilizes the community network for allowing communications between its employees, the employees of the company may comprise a community within the community network and the types of users may include titles of jobs or other categories of jobs held by the users within the company. It should be noted that the viewing privileges for each profile in a community may be manually configured by an administrator of the community, by the user having the profile, or by any other user designated by the database system for this purpose.

As an option, the users having viewing privileges to a particular profile may be automatically determined from rules defined by one of the aforementioned people. For example, the profile may indicate the users with viewing privileges by applying sharing rules to the profile. The sharing rules can contain a list of other users, groups of users, and/or hierarchies. For example, the sharing rules can be modeled to represent an organizational hierarchy, geographical configuration, or simply a flat list of individuals. These rules can be deeply nested, providing administrators with flexibility in defining the users with viewing privileges to the profile. In one exemplary embodiment, the rules may indicate that for users in a hierarchy (e.g. per user types, etc.), all users at the same level or higher level within the hierarchy as the user specific to the profile may have viewing privileges through the database system to the profile. Of course, any rules for evaluating which users have viewing privileges to a particular profile may be defined.

To this end, as described above, the users, once identified through the database system, can access the community network provided through the database system. Access to the community network by each of the users may include access to profiles of other users when the accessing user has viewing privileges to those profiles. As noted above, the viewing privileges for a particular user to a particular profile are indicated by the particular profile.

As shown in operation 104, a first file posted to a profile of a set of first users that are a subset of the users is received by the community network system via the database system. In particular, the first file is posted to the profile of one or more of the users (hereinafter first users). In response to the posting of the file, the file is received by the community network system via the database system. The database system may then store the first file.

In one embodiment, the first file may be posted to the profile of each of the first users by a third one of the users. For example, the third user of the community network system may select an option within the community network to post the first file to the profiles of the first users. In another embodiment, the first file may be posted to the profile of each of the first users by a custom application. The custom application may be configured to post the first file to the first users' profiles (e.g. via prompt of the third user or automatically). It should be noted that the custom application may be integrated with the community network through one or more application programming interfaces (APIs) of the community network system that are exposed and thus accessible to the custom application. In the context of the Salesforce™ community network, the APIs may be the SObject enterprise and partner APIs, the Chatter REST API, and/or the Files API.

The posting mentioned above may include uploading the first file (e.g. from a client device of the third user, from the custom application, etc.) to the community network system through the database system. As a further example, for each of the first users, the first file may be posted to the profile of the first user by posting the first file to the webpage of the community network that is specific to the profile of the first user. For example, the webpage may include an option for posting a file thereto. Of course, any of the users or custom application utilized by such users may post the first file to the profile of the first users.

Additionally, as shown in operation 106, in response to receiving the first file, the profile of each of the first users is associated with a reference to the first file. Thus, when the first file is posted to the profiles of the first users and accordingly received by the database system, a reference to the first file is then associated with those profiles. The reference may be any identifier of the first file. For example, the reference may be a unique name of the first file stored by the database system, a location of the first file in the database system, a unique key to a record specific to (e.g. describing) the first file stored in the database system, or any other data capable of being utilized to identify the first file.

It should also be noted that the reference to the first file may be associated with the profiles of the first users in any manner that provides a correlation between the first file and the profiles of the first users. In one embodiment, the reference may be stored directly in each of the profiles. In another embodiment, for each of the profiles of the first users, a link object having an identifier of the profile and an identifier of the file may be created and stored in the database system.

Further, as shown in operation 108, a request for files posted to the community network is received from a second one of the users, the request including criterion for the files. In particular, the request may be received by the community network system through the database system, and the second user may be any of the users of the community network. As an option, the request may be received by the second user entering the criterion and submitting the request in a user interface of the community network provided by the community network system through the database system.

As another option, the request maybe received from the second user via a custom application. For example, a custom application existing externally from the community network system may submit (e.g. on behalf of the second user) the request for the files through an API of the database system. In an embodiment where the community network system is a subsystem of a greater system (e.g. a multi-tenant on-demand database system), the custom application may or may not be stored and run by that greater system. In any case, a custom application, such as that as mentioned above, may be in communication with the community network system to submit the request for the files.

As also noted above, the request received from the second user includes criterion for the requested files. The criterion may be any information capable of being used for filtering files stored by the database system. For example, the criterion may be properties of the files (e.g. name, date created, etc.) or any other information specific to the requested files. Optionally, the criterion may be exclusive of an owner of the files (e.g. a user of the community network).

As shown in operation 110, a query is generated, by the community network system, in accordance with the request. In particular, the query may be generated in response to the request, and may include the criterion as filters. As an option, the query may also include an identifier of the second user that submitted the request, the reasons for which will be described in detail below.

Moreover, as shown in operation 112, the query is executed, by a processor of the community network system, to provide the second user access to the first file based on viewing privileges of the second user. In this way, access to the first file by the second user may be restricted based on viewing privileges of the second user to profiles of other users of the community network. In particular, the second user may only have access to content, including files, included in (e.g. posted to) profiles of users of the community network that the second user is permitted to access, as indicated by the viewing privileges indicated by those profiles.

Of course, the viewing privileges of the second user may only be taken into account, and particularly the basis for providing the second user with access to the first file when the first file is posted to the profile of the set of first users and when an option to share the file based on viewing privileges has been enabled. It should also be noted that while the query is described as being executed for providing the second user access to the first file based on viewing privileges of the second user, the query may be similarly executed in terms of other files posted to, and thus received and stored by, the database system.

As shown in detail in operation 112, executing the query to provide the second user access to the first file based on viewing privileges of the second user includes determining that the first file meets criterion of the query. For example, the first file is identified as matching the criterion input by the second user when requesting files of the database system and included in the query.

Additionally, the profile of each of the first users having the reference to the first file is determined. For example, based on the first file being identified as meeting the criterion of the query, profiles associated with that first file are determined. As described above, the first file was posted to the profile of each of the first users and accordingly a reference to the first file was associated with the profiles of those first users. In this way, the profile of each of the first users are determined since they have the reference to the first file.

Still yet, the second user is provided access to the first file when the profile of at least one of the first users is accessible to the second user, otherwise the community network system denies the second user from accessing the first file when the profile of all of the first users is inaccessible to the second user. Thus, in one embodiment, if the second user has visibility privileges to the profile of one (or more) of the first users, then the second user is determined to be allowed to access the first file and the first file is therefore made accessible to the second user. Further, in another embodiment, if the second user does not have visibility privileges to any of the profiles of the first users, then the second user is determined to not be allowed to access the first file and the first file is therefore not made accessible to the second user.

To accomplish determining whether to provide the second user access to the first file based on the visibility privileges of the second user, executing the query as mentioned in operation 112 may include determining whether the profile of any one of the first users is accessible to the second user. This determination of whether the profile of any one of the first users is accessible to the second user may be performed, for example, at run-time in response to receiving, from the second one of the users, the request for files posted to the community network.

In this way, the method 100 of FIG. 1 enables files posted to the community network to only be shared with users permitted to access the profiles to which the files are posted. Particularly, when a user performs a search of files posted to the community network, files matching the user's search criteria are determined, profiles having those determined files are also determined, and the user's access to those determined profiles is determined. The user may then be provided with relevant search results limited to only including files that have been posted to profiles that the user is permitted to access.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
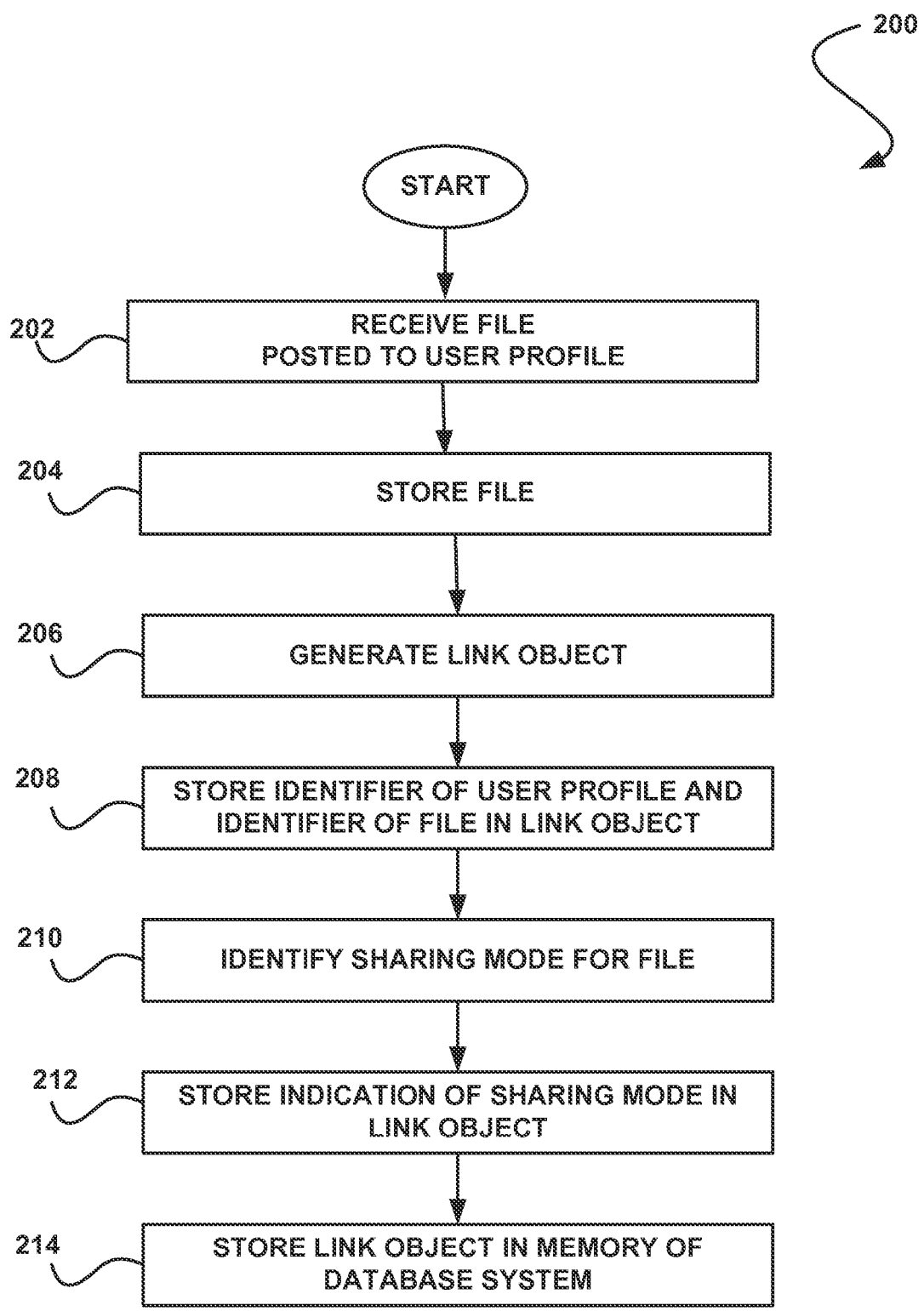
FIG. 2 illustrates a method for generating a link object for a file posted to a user profile, in accordance with an embodiment.

FIG. 2 illustrates a method 200 for generating a link object for a file posted to a user profile, in accordance with an embodiment. As an option, the method 200 may be carried out in the context of the method 100 of FIG. 1. For example, the method 200 may be carried out by the community network system through the database system described above with respect to FIG. 1. Of course, however, the method 200 may be carried out in any desired context. It should also be noted that the aforementioned definitions may apply during the present description.

As shown in operation 202, a file posted to a user profile is received. Receiving the file may be performed similarly as described above with respect to operation 104 of FIG. 1. For example, upon a user posting a file to another user's profile (e.g. including uploading the file to the community network system through the database system), the file may be received by the community network system through the database system.

In response to receipt of the file, the file is stored, as shown in operation 204. In one embodiment, the file may be stored in the memory of the community network system, such as in the memory of the database system. The file may optionally be stored (e.g. in a record of the database system) in association with a unique identifier thereof metadata describing the file, and/or any other desired information relevant to the file.

Additionally, as shown in operation 206, a link object is generated. In the present embodiment, the link object is any data object utilized for providing a reference between the file and the profile to which the file was posted. For example, the link object may be a database record.

Further, as shown in operation 208, an identifier of the profile and an identifier of the file are both stored in the link object. The identifier of the file may be the unique identifier of the file mentioned above, as an option. The identifier of the profile may be any unique identifier of the profile to which the file was posted. For example, the identifier of the profile may be retrieved from a profile object specific to (e.g. having data describing, representing, etc.) the profile of the user.

A sharing mode for the file is also determined, as shown in operation 210. In the present embodiment, the sharing mode indicates which type of access restriction is to be placed on the file. The sharing mode may be indicated by the user that posted the file when posting the file to the aforementioned user's profile, or as another option the sharing mode may be previously set by the user that posted the file for being applied to all files posted by that user.

A first type of access restriction may be that the file is to be privately shared. In this case, the file is only accessible to the user having the profile to which the file was posted. In other words, the file is privately shared with the user having the profile to which the file was posted.

A second type of access restriction may be that the file is to be publicly shared. In this case, the file is made accessible to all users that are within the same community of the community network as the user having the profile to which the file was posted. Thus, when a file is posted to a profile within a particular community, then all users within that particular community are allowed to access the file.

A third type of access restriction may be that the file is to be shared based on visibility privileges relating to user profiles. The visibility privileges may specifically indicate, for each profile, which users are allowed to access (e.g. view, etc.) the profile. Accordingly, the user posting the file to a particular profile can ensure that only users with access to that profile are allowed access to the file. Of course, other types of access restrictions may also be available for regulating access to the file.

Furthermore, as shown in operation 212, an indication of the sharing mode is stored in the link object. In one embodiment, indication may be include an identifier (e.g. code, etc.) uniquely identifying the sharing mode in accordance with which the file was posted to the user's profile. In another embodiment, the indication may be a flag that is set in a particular portion of the link object that is specific to the particular sharing mode identified for the file in operation 210.

The link object is then stored in memory of the database system, as shown in operation 214. As noted above, the link object may, in one embodiment, be stored as a data record of the database system.

Figure 3A:
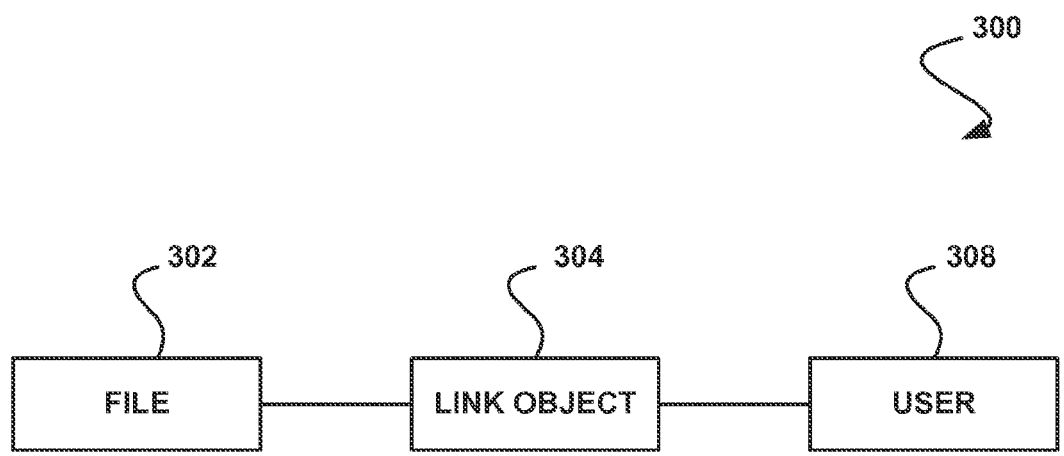
FIGS. 3A-B illustrate representations of link objects associating user profiles and files posted thereto, in accordance with an embodiment, in accordance with an embodiment.
Figure 3B:
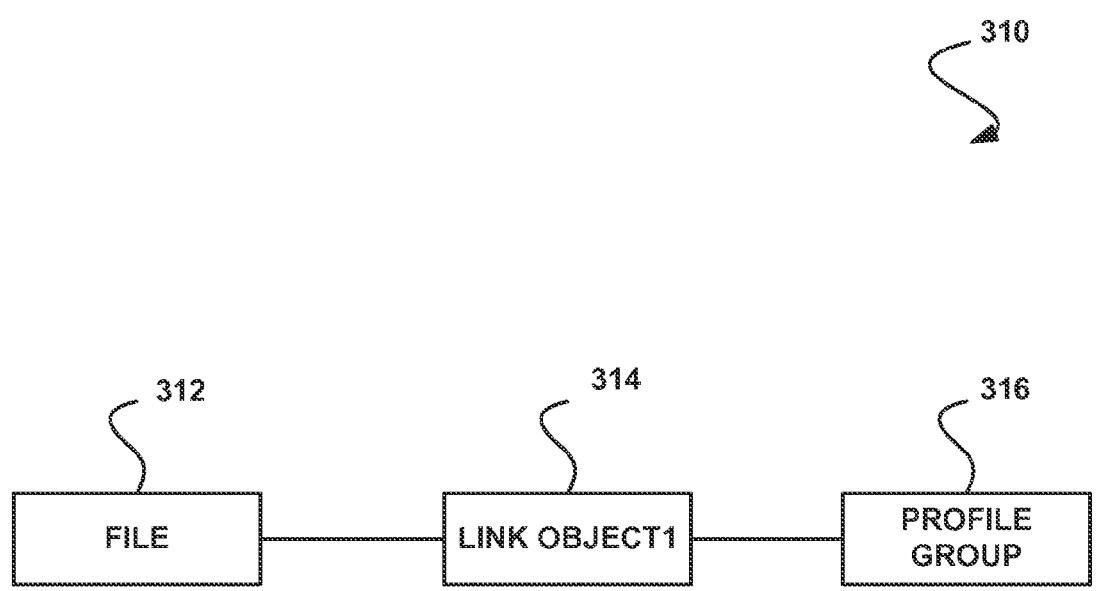

FIGS. 3A-B illustrate representations 300 and 310, respectively, of link objects associating user profiles and files posted thereto, in accordance with an embodiment. As an option, the object representations 300 and 310 may be implemented in the context of the link object stored in operation 214 of FIG. 2. Of course, however, the object representations 300 and 310 may be implemented in any desired context. It should also be noted that the aforementioned definitions may apply during the present description.

As shown in FIG. 3A, a link object 304 associates a file 302 and a profile of a user 306. The profile of the user 306 may be represented in the system as a profile object that is specific to the profile of the user 306. Similarly, the file 302 may be represented in the system as a file object that is specific to the file 302.

The link object 304 may store both a reference to the file 302 and a reference to the profile of the user 306. As a further option, the profile of the user 306 may store a reference to the link object 304, which may in turn store a reference to the file 302.

As shown in FIG. 3B, a link object 312 associates a file 312 and a group of (e.g. a plurality of) users 316. The group of users 316 may be represented in the system as a group object indicating the group of users 316. For example, the group object may includes references to each of the users in the group of users 316. Further, such group of users 316 may consist of users having visibility privileges to the profile to which the file 312 was posted.

The link object 312 may store both a reference to the file 312 and a reference to the group of users 316. As another option, the group of users 316 may store a reference to the link object 312 and the link object 312 may store a reference to the file 312.

It should be noted that while the representations 300 and 310 of FIGS. 3A and 3B, respectively, are shown as separate embodiments, those embodiments may optionally be utilized in combination with one another in the database system.

As yet another option (not shown), a file may be associated with a particular folder included within a profile of a user. In this case, the folder, by designation, may store content that is accessible to users based on those users' visibility privileges to the profile that includes the folder. In this option, a link object may associate the file to the folder, and the folder may further be associated to the profile.

Figure 4:
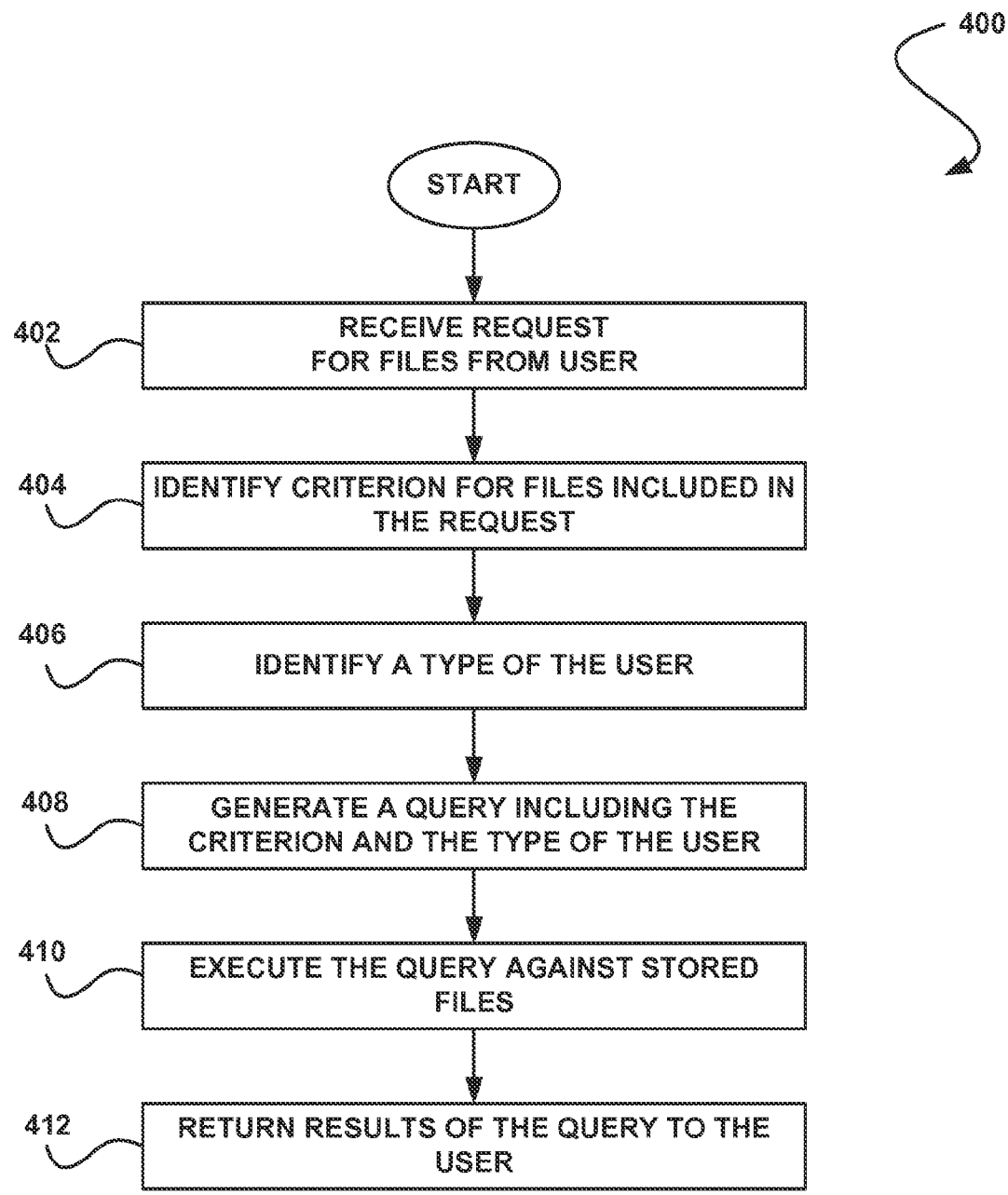
FIG. 4 illustrates a method for querying files, in accordance with an embodiment.

FIG. 4 illustrates a method 400 for querying files, in accordance with an embodiment. In one embodiment, the method 400 may be carried out in the context of the method 100 of FIG. 1 (e.g. by the community network system through the database system described above with respect to FIG. 1). In another embodiment, the method 400 may be carried out subsequent to the method 200 of FIG. 2. Of course, however, the method 400 may be carried out in any desired context. It should also be noted that the aforementioned definitions may apply during the present description.

As shown in operation 402, a request for files is received from a user. The request may be received in response to the user being identified (e.g. by the community network system through the database system). For example, the user may be required to log into the community network system through the database system prior to submitting a request for files. In one embodiment, the request may be received as described above with respect to operation 108 of FIG. 1.

Criterion for the files that is included in the request is then identified, as shown in operation 404. For example, criterion input by the user when making the request for the files may be identified. Such criterion may be filtering criterion that identifies particular properties of the files being requested.

Further, a type of the user is identified, as shown in operation 406. The type may be one of a plurality of preconfigured possible user types. For example, the possible user types may be user roles within the community of which the user is a member. The user may be identified from the login of the user mentioned above, and then the type of that user identified (e.g. from a profile of the user). It should be noted that while the user type is described herein, any kind of identifier associated with the second user may be utilized when profile viewing privileges are based on that kind of identifier.

A query including the criterion and the type of the user is then generated, as shown in operation 408. The query may include the criterion and the type of the user as filters for the files being requested. For example, the query may include instructions (e.g. code) to identify files that meet the criterion AND that are accessible to the user (based on the user's type). Thus, when evaluating the query, the sharing mode in which a file was posted to a particular profile may be taken into account when determining whether that file is accessible to the user.

Still yet, as shown in operation 410, the query is executed against the stored files. Results of the query are then returned to the user, as shown in operation 412. The results may include a list of the files returned from the query, links to the files returned from the query, identifies of the files returned from the query, etc.

Exemplary Use Case

The community network may support a community of partners for a company. The community may therefore be comprised of users that include one or more employees of the company, as well as one or more employees of each of the partners to that company. The company may not necessarily desire for the partners to be visible to each other within the community. Accordingly, an administrative user for the company may configure the profiles of partner users such that users for one partner cannot see profiles of users of any of the other partners.

In accordance with the embodiments described above, whenever any user (i.e. company user or partner user) posts a file to a profile of one of the partner users, the users associated with another partner will be prevented from viewing or otherwise accessing that file.

System Overview

Figure 5:
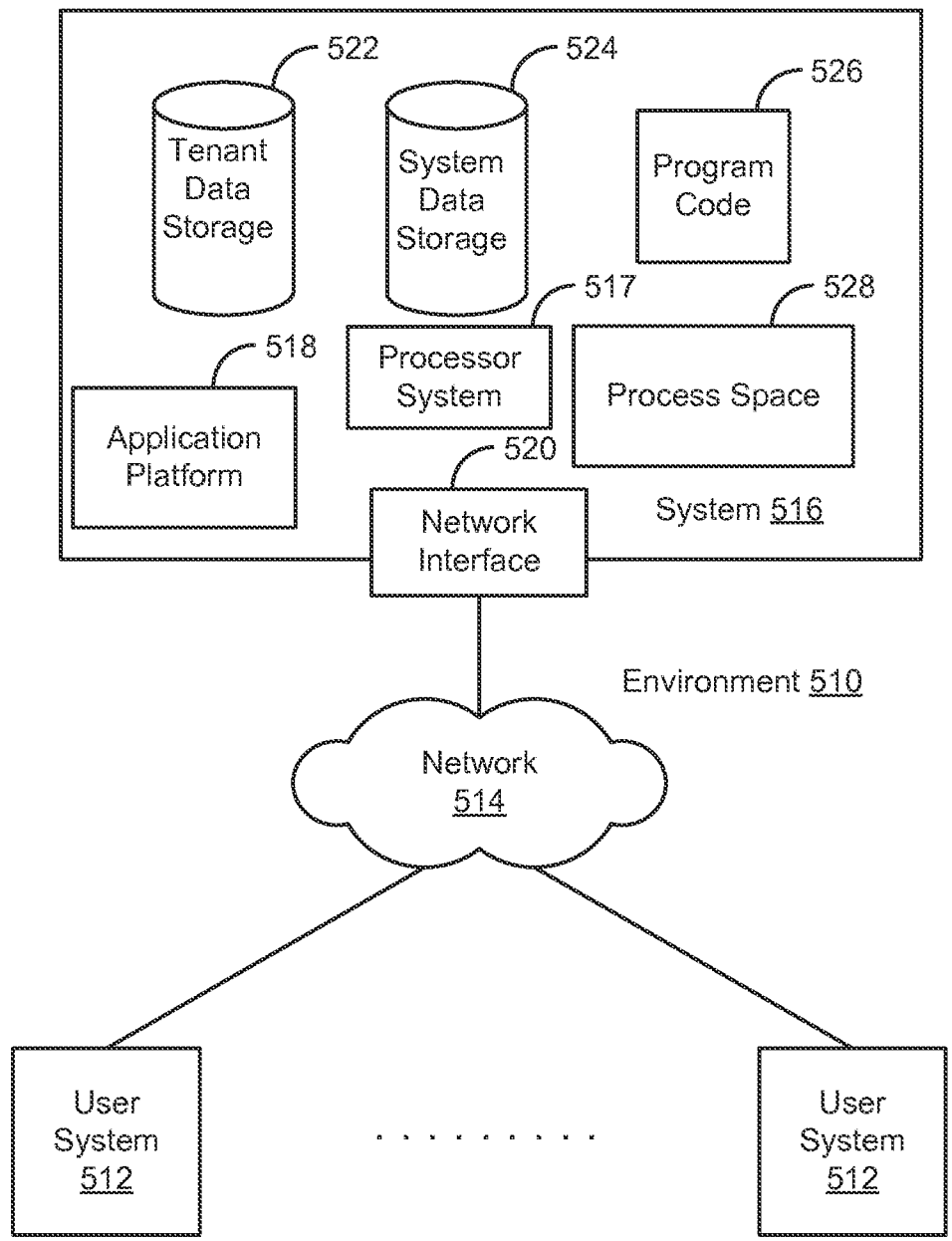
FIG. 5 illustrates a block diagram of an example of an environment wherein an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528.

In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 6:
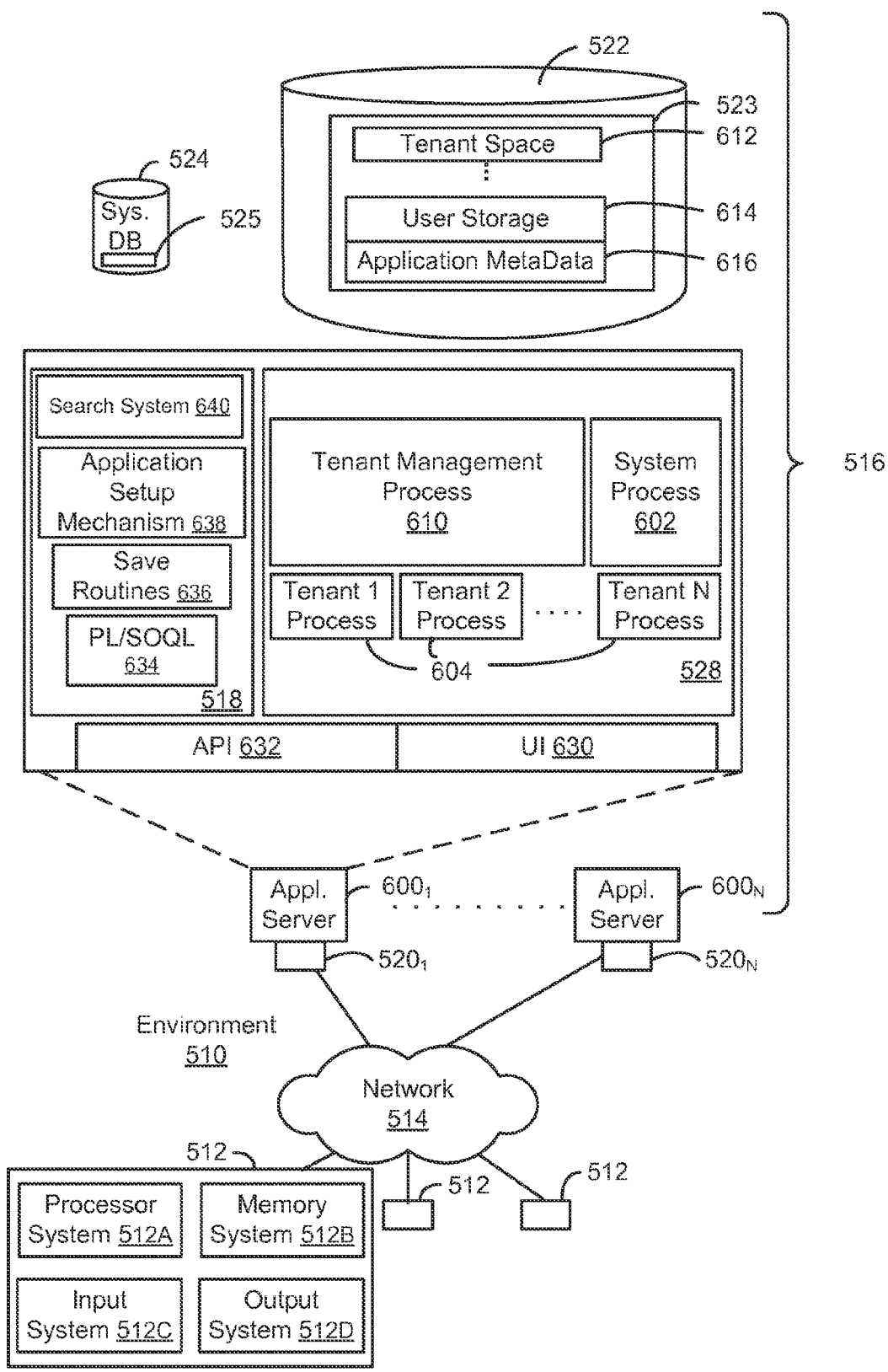
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 5121) may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, hereby incorporated in its entirety herein for all purposes. Invocations to applications may be detected by one or more system processes, which manages retrieving application metadata 516 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM", issued Aug. 27, 2010 to Craig Weissman, and hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory computer-readable medium having computer readable program code embodied therein, the computer readable program code capable of being executed to implement a method comprising:
   providing a community network service to a plurality of users through a computer system, wherein the computer system is configured to store in memory one or more profiles for various sets of one or more of the plurality of users, wherein each of the one or more profiles identifies which of the plurality of users are permitted to access information associated with that profile;
   receiving, by the community network service from a first user of the plurality of users, a first file posted to a first set of two or more users that are a subset of the plurality of users;
   in response to receiving the first file, including a reference to the first file in one or more profiles associated with the first set of users;
   receiving, by the community network service from a second user of the plurality of users, a request for one or more files, wherein the request specifies criteria for identifying the one or more files;
   generating, by the community network service, a query in accordance with the request;
   executing the query, including:
      in response to determining that the first file meets the specified criteria and in response to determining a set of profiles that each include a reference to the first file, providing, to the second user, access to the first file when at least one of the determined set of profiles is accessible to the second user; and
      otherwise, denying the second user from accessing the first file.

2. The computer-readable medium of claim 1, wherein executing the query includes determining, at run-time in response to receiving the request, whether at least one of the determined set of profiles is accessible to the second user.

3. The computer-readable medium of claim 1, wherein the community network service is accessible to users that have been identified using a database of the computer system, wherein the database stores information indicating viewing privileges for ones of the plurality of users.

4. The computer-readable medium of claim 3, wherein executing the query includes determining, from the database, that the second user has a particular one of a plurality of preconfigured user types within an entity, wherein the particular user type is used to determine whether at least one of the determined set of profiles is accessible to the second user.

5. The computer-readable medium of claim 1, wherein the request is received through an application programming interface (API) of a database system.

6. The computer-readable medium of claim 1, wherein each of the plurality of users has an account recognized by the community network service.

7. The computer-readable medium of claim 6, wherein, for each of the plurality of users, a corresponding profile is associated with that user's account.

8. The computer-readable medium of claim 1, wherein the first file is posted to a particular profile associated with all of the first set of users in response to the first user posting the first file to a community network webpage specific to the particular profile.

9. The computer-readable medium of claim 8, wherein the community network webpage displays a content feed having content posted to the profile of the first set of users.

10. The computer-readable medium of claim 1, wherein executing the query includes verifying that an option to share the first file based on user privileges has been enabled.

11. The computer-readable medium of claim 1, wherein including a reference to the first file in a first of the one or more profiles associated with the first set of users includes storing in a database system a link object having an identifier of the first profile and an identifier of the first file.

12. The computer-readable medium of claim 11, wherein the link object further includes an indicator that the first file is to be shared based on viewing privileges of a requesting user.

13. The computer-readable medium of claim 1, wherein executing the query includes generating an identifier associated with the second user.

14. The computer-readable medium of claim 13, wherein executing the query includes using the identifier to determine whether at least one of the determined set of profiles is accessible to the second user.

15. A method, comprising:
   providing a community network service to a plurality of users through a computer system configured to store one or more profiles for various sets of one or more of the plurality of users, wherein each of the one or more profiles identifies which of the plurality of users are permitted to access information associated with that profile;
   receiving, by the community network service, a first file posted to a particular profile of a first set of two or more users that are a subset of the plurality of users;
   in response to receiving the first file, associating the particular profile with a reference to the first file;
   receiving, from a requesting one of the plurality of users, a request for files accessible via the community network service, the request including criteria for identifying the files;
   generating, by the community network service, a query in accordance with the request;

executing the query, including:
    determining that the first file meets the criteria of the query;
    determining a set of profiles including a reference to the first file; and
    providing the requesting user access to the first file when at least one of the determined set of profiles is accessible to the requesting user.

16. The method of claim 15, wherein a first profile for a particular user of the plurality of users indicates that the particular user is within a first group of the plurality of users whose posted content is not accessible to other users within the first group, wherein the first profile indicates that the particular user's posted content is accessible to users within a second group of the plurality of users, and wherein the first and second groups have no common users.

17. A non-transitory computer-readable medium having computer instructions stored thereon that are capable of being executed by a computer system to cause operations comprising:
    providing a community network service through a database system of a community network system, wherein the community network service is accessible to a plurality of users after being identified through the database system, wherein the database system stores a profile for each of the plurality of users, wherein each of the profiles identifies which of the plurality of users have viewing privileges through the database system to information associated with that profile;
    receiving, by the community network service via the database system, a first file that is posted to a particular profile of a first set of two or more users that are a subset of the plurality of users;
    in response to receiving the first file, associating the particular profile with a reference to the first file;
    receiving, from a requesting one of the plurality of users, a request for files posted to the community network system, the request including criteria for the files;
    generating, by the community network system, a query in accordance with the request;
    executing the query, by a processor of the community network system, to provide the requesting user access to the first file based on viewing privileges of the requesting user, including by:
        determining that the first file meets the criteria of the query;
        determining a set of profiles that include references to the first file; and
        providing the requesting user access to the first file when at least one of the determined set of profiles is indicated as accessible to the requesting user, and otherwise denying the requesting user from accessing the first file.

18. The computer-readable medium of claim 17, wherein executing the query includes determining, from the database system, that the requesting user has a particular one of a plurality of preconfigured user types with an entity, wherein the particular user type is used to determine whether at least one of the determined set of profiles is accessible to the requesting user.

19. The computer-readable medium of claim 17, wherein executing the query includes determining, at run-time, at least one of the determined set of profiles is indicated as accessible to the requesting user.

20. The computer-readable medium of claim 17, wherein associating the particular profile with a reference to the first file includes storing a link object that includes an identifier for the particular profile and an identifier for the first file.

* * * * *